United States Patent
Degroot et al.

(10) Patent No.: US 11,230,641 B2
(45) Date of Patent: Jan. 25, 2022

(54) POLYOLEFIN BASED ELASTIC COMPOSITIONS, METHODS OF MANUFACTURING THEREOF AND ARTICLES COMPRISING THE SAME

(71) Applicant: DOW GLOBAL TECHNOLOGIES LLC, Midland, MI (US)

(72) Inventors: Jacquelyn A. Degroot, Sugar Land, TX (US); Thor E. Gardarsson, Gothenburg (SE); Lisa S. Madenjian, Lake Jackson, TX (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 163 days.

(21) Appl. No.: 15/747,917

(22) PCT Filed: Jul. 21, 2016

(86) PCT No.: PCT/US2016/043317
§ 371 (c)(1),
(2) Date: Jan. 26, 2018

(87) PCT Pub. No.: WO2017/019446
PCT Pub. Date: Feb. 2, 2017

(65) Prior Publication Data
US 2018/0223092 A1  Aug. 9, 2018

Related U.S. Application Data

(60) Provisional application No. 62/197,268, filed on Jul. 27, 2015.

(51) Int. Cl.
C08L 53/00 (2006.01)
B32B 5/02 (2006.01)
(Continued)

(52) U.S. Cl.
CPC .............. *C08L 53/00* (2013.01); *B32B 5/022* (2013.01); *B32B 7/12* (2013.01); *B32B 27/08* (2013.01);
(Continued)

(58) Field of Classification Search
CPC ...... C08L 53/00; C08L 2205/025; B32B 5/02; B32B 5/022; B32B 7/12; B32B 27/08; B32B 27/12; B32B 27/32; B32B 37/153
(Continued)

(56) References Cited

U.S. PATENT DOCUMENTS 4,041,203 A   8/1977  Brock et al.
4,107,364 A   8/1978  Sisson
(Continued)

FOREIGN PATENT DOCUMENTS

EP   0100843 A1   2/1984
WO   0001745 A1   1/2000
(Continued)

OTHER PUBLICATIONS

Wang et al.; "Comparison of blocky and random ethylene-octene copolymers based on the structure and elastomeric properties"; Annual Technical Conference—ANTEC, Conference Proceedings 2; Jan. 2007, pp. 1181-1185.
(Continued)

*Primary Examiner* — Peter Y Choi
(74) *Attorney, Agent, or Firm* — Cantor Colburn LLP

(57) ABSTRACT

Disclosed herein is a film comprising a polymer blend, the polymer blend comprising a first polyolefin elastomer having a weight average molecular weight of 120,000 to 350,000 grams per mole; and a second polyolefin elastomer having a weight average molecular weight of 15,000 to 75,000 grams per mole; wherein the overall melt index of the polymer blend is less than 8 g/10 minutes when mea-
(Continued)

sured as per ASTM D1238 at 2.16 kilograms at 190° C. Disclosed herein too is a method of manufacturing a film comprising blending a first polyolefin elastomer having a weight average molecular weight of 120,000 to 350,000 grams per mole; and a second polyolefin elastomer having a weight average molecular weight of 15,000 to 75,000 grams per mole to form a polymer blend; wherein the overall melt index of the polymer blend is less than 8 g/10 minutes when measured as per ASTM D1238 at 2.16 kilograms at 190° C.; and forming the polymer blend into a film.

13 Claims, 6 Drawing Sheets

(51) Int. Cl.
*B32B 27/08* (2006.01)
*B32B 27/12* (2006.01)
*B32B 27/32* (2006.01)
*B32B 27/28* (2006.01)
*B32B 7/12* (2006.01)
*B32B 37/15* (2006.01)
*B29C 48/00* (2019.01)
*B29K 23/00* (2006.01)
*B29K 96/04* (2006.01)
*B29K 105/00* (2006.01)
*B29L 31/48* (2006.01)
*B32B 38/00* (2006.01)

(52) U.S. Cl.
CPC .............. *B32B 27/12* (2013.01); *B32B 27/28* (2013.01); *B32B 27/32* (2013.01); *B32B 37/153* (2013.01); *B29C 48/0018* (2019.02); *B29K 2023/08* (2013.01); *B29K 2096/04* (2013.01); *B29K 2105/0085* (2013.01); *B29K 2995/0053* (2013.01); *B29L 2031/4878* (2013.01); *B32B 38/0008* (2013.01); *B32B 2262/00* (2013.01); *B32B 2262/02* (2013.01); *B32B 2307/30* (2013.01); *B32B 2307/51* (2013.01); *B32B 2307/514* (2013.01); *B32B 2307/518* (2013.01); *B32B 2307/732* (2013.01); *B32B 2307/738* (2013.01); *B32B 2555/00* (2013.01); *B32B 2555/02* (2013.01); *C08L 2203/16* (2013.01); *C08L 2205/02* (2013.01); *C08L 2205/025* (2013.01)

(58) Field of Classification Search
USPC ........................................................ 442/104
See application file for complete search history.

(56) References Cited

U.S. PATENT DOCUMENTS

| | | | |
|---|---|---|---|
| 4,116,892 A | 9/1978 | Schwarz | |
| 4,153,751 A | 5/1979 | Schwarz | |
| 4,209,463 A | 6/1980 | Maender et al. | |
| 4,230,831 A * | 10/1980 | Sakurai | C08L 23/06 525/240 |
| 4,368,565 A | 1/1983 | Schwarz | |
| 4,525,407 A | 6/1985 | Ness | |
| 4,547,551 A | 10/1985 | Bailey et al. | |
| 4,720,415 A | 1/1988 | Vander Wielen et al. | |
| 4,762,890 A | 8/1988 | Strait et al. | |
| 4,927,888 A | 5/1990 | Strait et al. | |
| 4,950,541 A | 8/1990 | Tabor et al. | |
| 5,143,679 A | 9/1992 | Weber et al. | |
| 5,145,727 A | 9/1992 | Potts et al. | |
| 5,156,793 A | 10/1992 | Buell et al. | |
| 5,167,897 A | 12/1992 | Weber et al. | |
| 5,169,706 A | 12/1992 | Collier, IV et al. | |
| 5,178,931 A | 1/1993 | Perkins et al. | |
| 5,188,885 A | 2/1993 | Timmons et al. | |
| 5,504,172 A | 4/1996 | Imuta et al. | |
| 5,783,638 A | 7/1998 | Shih-Yawlai et al. | |
| 6,525,157 B2 | 2/2003 | Cozewith et al. | |
| 6,610,408 B1 * | 8/2003 | Srinivasan | C08L 23/12 428/423.1 |
| 6,960,635 B2 | 11/2005 | Stevens et al. | |
| 7,199,203 B2 | 4/2007 | Stevens et al. | |
| 7,355,089 B2 | 4/2008 | Chang et al. | |
| 7,498,282 B2 | 3/2009 | Patel et al. | |
| 7,608,668 B2 | 10/2009 | Shan et al. | |
| 7,741,397 B2 | 6/2010 | Liang et al. | |
| 7,915,192 B2 | 3/2011 | Arriola et al. | |
| 8,337,190 B2 | 12/2012 | Curro et al. | |
| 2003/0088228 A1 | 5/2003 | Desai et al. | |
| 2004/0222553 A1 | 11/2004 | Desai et al. | |
| 2005/0266256 A1 | 12/2005 | Yamamoto et al. | |
| 2006/0003656 A1 | 1/2006 | Morman | |
| 2006/0199930 A1 | 9/2006 | Shan et al. | |
| 2008/0153970 A1 * | 6/2008 | Salazar | C08F 297/044 524/505 |
| 2010/0056727 A1 | 3/2010 | Lipishan et al. | |
| 2013/0090433 A1 * | 4/2013 | Jiang | C08F 210/18 525/232 |
| 2017/0253012 A1 | 9/2017 | Chang et al. | |
| 2017/0334175 A1 * | 11/2017 | Lawrence | B32B 7/12 |

FOREIGN PATENT DOCUMENTS

| | | |
|---|---|---|
| WO | 2004020174 A1 | 3/2004 |
| WO | 2005090425 A1 | 9/2005 |
| WO | 2005090426 A1 | 9/2005 |
| WO | 2005090427 A2 | 9/2005 |
| WO | 2006101966 A1 | 9/2006 |
| WO | 2006108590 A1 | 10/2006 |
| WO | 2007051103 A2 | 5/2007 |
| WO | 2009094506 A1 | 7/2009 |
| WO | 2015047604 A1 | 4/2015 |

OTHER PUBLICATIONS

International Search Report for International Application No. PCT/US2016/043317, International Filing Date Jul. 21, 2016, dated Sep. 28, 2016, 6 pages.
Markovich et al.; "Development of Gel Permeation Chromatography-Fourier Transform Infrared Spectroscopy for Characterization of Ethylene Based Polyolefin Copolymers"; Polymeric Materials Science and Engineering, vol. 65, 1991, pp. 98-100.
U.S. Appl. No. 60/566,2938, filed Mar. 17, 2005.
U.S. Appl. No. 60/662,937, filed Mar. 17, 2005.
U.S. Appl. No. 60/662,939, filed Mar. 17, 2005.
Written Opinion for International Application No. PCT/US2016/043317, International Filing Date Jul. 21, 2016, dated Sep. 28, 2016, 8 pages.

* cited by examiner

POLYOLEFIN BASED ELASTIC COMPOSITIONS, METHODS OF MANUFACTURING THEREOF AND ARTICLES COMPRISING THE SAME

CROSS REFERENCE TO RELATED APPLICATIONS

This application is a National Stage application of PCT/US2016/043317, filed Jul. 21, 2016, which claims the benefit of U.S. Provisional Application No. 62/197,268, filed Jul. 27, 2015, both of which are incorporated by reference in their entirety herein.

BACKGROUND

This disclosure relates to polyolefin based elastic compositions methods of manufacture thereof and to articles comprising the same. In particular it relates to polyolefin based elastic compositions, films and laminates.

Extensible laminate materials that include films, such as, elastic films, are commonly used for a wide variety of applications. Disposable hygiene products, especially consumer-related products, often have one or more elastic elements that are integral to their use, function, or appeal. Highly elastic elements can be critical to the fit of certain consumer-related products, such as, diapers, training pants and adult incontinence products in the waist, ears, sidepanels, and cuff regions. The smaller the area of the elastic element the more critical is its performance and ability to hold the article in place for both fit, comfort, and to prevent leakage. Elastic films, however, are not without their drawbacks. The films can be difficult to handle due to tackiness of the films on the roll, which can cause blocking, i.e., where the film sticks to itself, or causes machinability issues where the film sticks to equipment parts.

There have been various approaches taken to provide highly elastic elements. For example, elastic films or nonwoven webs have been formulated from elastic materials, such as, styrenic block copolymers (SBCs). SBCs can exhibit excellent physical properties, such as, elasticity and flexibility; however, elastic films or nonwoven webs made entirely of SBCs can be costly. Furthermore, certain styrenic block copolymers can have a limited process window as a result of poor thermal stability. For example, styrene-isoprene-styrene (SIS) and styrene-butadiene-styrene (SBS) can undergo thermal degradation and consequently suffer from decreased processability, machinability, and/or reduced mechanical performance. SBCs with hydrogenated midblocks such as styrene-ethylene/butylene-styrene (SEBS), styrene-ethylene/propylene-styrene (SEPS), and other SBCs can exhibit greater thermal stability but suffer due to greater energy intensity, higher $CO_2$ output, and other environmental and economic disadvantages in the course of their manufacture. Though thermally more stable and more environmentally and economically advantaged than some SBCs, polyolefin elastomers can exhibit lower than desired elastic performance.

Other approaches for providing highly elastic elements involve laminating an elastomer film to a nonwoven substrate to form a laminate, and then stretching the laminate to activate the non-woven and impart the necessary elasticity. Still other approaches involve coextruding a low crystallinity elastic core material with less elastic, less tacky, or higher crystallinity materials in the skins to reduce blocking and improve the machinabilty and handling of the film and then stretching the film to break the skins and impart the necessary elasticity that is provided by the core. Such films can be stretched to impart the desired elasticity as disclosed in U.S. Pat. No. 7,498,282.

Accordingly, alternative approaches for polyolefin-based elastic film structures, laminates, and methods of manufacture of such items are disclosed herein.

SUMMARY

Disclosed herein is a film comprising a polymer blend, the polymer blend comprising a first polyolefin elastomer having a weight average molecular weight of 120,000 to 350,000 grains per mole; and a second polyolefin elastomer having a weight average molecular weight of 15,000 to 75,000 grams per mole; wherein the overall melt index of the polymer blend is less than 8 g/10 minutes when measured as per ASTM D1238 at 2.16 kilograms at 190° C.

Disclosed herein too is a method of manufacturing a film comprising blending a first polyolefin elastomer having a weight average molecular weight of 120,000 to 350,000 grams per mole; and a second polyolefin elastomer having a weight average molecular weight of 15,000 to 75,000 grains per mole to form a polymer blend; wherein the overall melt index of the polymer blend is less than 8 g/10 minutes when measured as per ASTM D1238 at 2.16 kilograms at 190° C.; and forming the polymer blend into a film.

DETAILED DESCRIPTION

Figure 1:
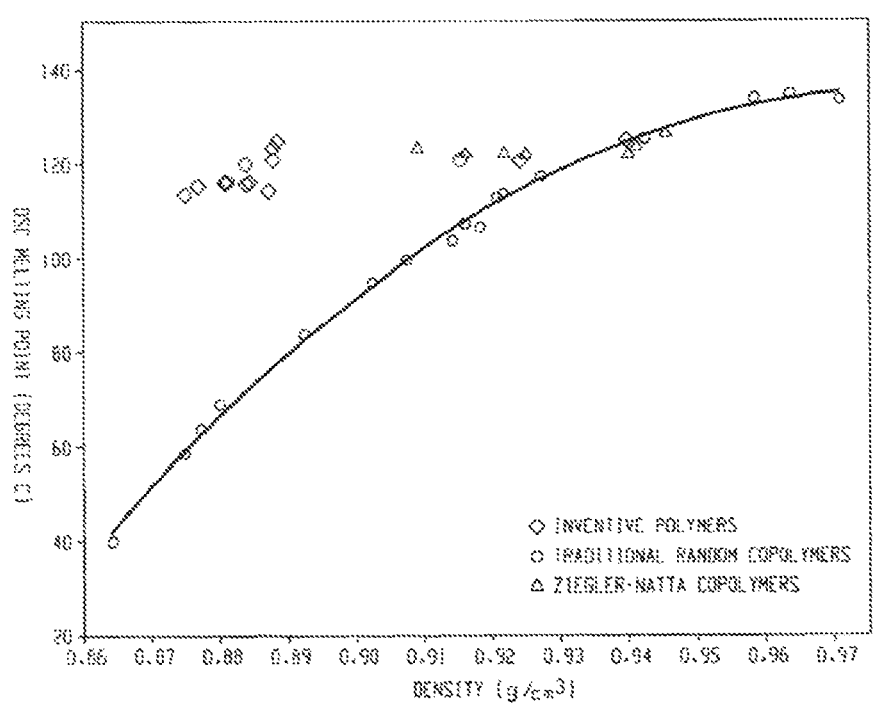
FIG. 1 shows the melting point/density relationship for ethylene/α-olefin block copolymers and random copolymers.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/a-olefin polymer" and "propylene/a-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term "and/or" includes both "and" as well as "or". For example, the term A and/or B is construed to mean A, B or A and B.

"Low crystallinity", "high crystallinity" and like terms are used in a relative sense, not in an absolute sense. However, low crystallinity layers have crystallinity of from about 1 to about 25, preferably from about 1 to about 20, and more preferably from about 1 to about 15 weight percent crystallinity, based on the total weight of the layer. High crystallinity layers have crystallinity of 25 weight percent or greater, based on the total weight of the layer.

High crystalline polymers often include linear low density polyethylene (LLDPE), low density polyethylene (LDPE), LLDPE/LDPE blends, high density polyethylene (HDPE), homopolypropylene (hPP), substantially linear ethylene polymer (SLED), random propylene based copolymer, random copolymer (RCP), and the like, and various blends thereof. Low crystallinity polymers of particular interest preferably include ethylene/α-olefin multi-block interpolymers defined and discussed in copending PCT Application No. PCT/US2005/008917, filed on Mar. 17, 2005 and published on Sep. 29, 2005 as WO/2005/090427, which in turn claims priority to U.S. Provisional Application No. 60/553, 906, filed Mar. 17, 2004, both which are incorporated by reference.

Low crystalline polymers also include propylene/ethylene, propylene/1-butene, propylene/1-hexene, propylene/4-methyl-1-pentene, propylene/1-octene, propylene/ethylene/ 1-butene, propylene/ethylene/ENB, propylene/ethylene/1-hexene, propylene/ethylene/1-octene, propylene/styrene, and propylene/ethylene/styrene.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

"LLDPE" refers to linear ethylene alpha olefin copolymers having a density in the range of from about 0.855 about 0.912 g/cm$^3$ to about 0.925 g/cm$^3$). "LLDPE" may be made using chromium, Ziegler-Natta, metallocene, constrained geometry, or single site catalysts. The term "LLDPE" includes znLLDPE, uLLDPE, and mLLDPE. "znLLDPE" refers to linear polyethylene made using Ziegler-Natta or chromium catalysts and typically has a density of from about 0.912 to about 0.925 and a molecular weight distribution greater than about 2.5, "uLLDPE" or "ultra linear low density polyethylene" refers to linear polyethylene having a density of less than 0.912 g/cm$^3$), but which is made using chromium or Ziegler-Natta catalysts and thus typically have a molecular weight distribution ("MWD") greater than 2.5. "mLLDPE" refers to LLDPE made using metallocene, constrained geometry, or single site catalysts. These polymers typically have a molecular weight distribution ("MWD") in the range of from 1.5 to 8.0. These resins will typically have a density in the range of from about 0.855 to 0.925 g/cm$^3$. Preferred copolymers include 1-hexene and 1-octene.

"MDPE" refers to linear polyethylene having a density in the range of from greater than 0.925 g/cm$^3$ to about 0.940 g/cm$^3$). "MDPE" is typically made using chromium or Ziegler-Matta catalysts or using metallocene, constrained geometry, or single cite catalysts and typically have a molecular weight distribution ("MWD") greater than 2.5.

"HDPE" refers to linear polyethylene having a density in the range greater than or equal to 0.940 g/cm$^3$). "HDPE" is typically made using chromium or Ziegler-Natta catalysts or using metallocene, constrained geometry, or single cite catalysts and typically have a molecular weight distribution ("MWD") greater than 2.5.

"Polypropylene" shall mean polymers comprising greater than 50% by weight of units which have been derived from propylene monomer. This includes homopolymer polypropylene, random copolymer polypropylene, impact copolymer polypropylene, and propylene based plastomers and elastomers. These polypropylene materials are generally known in the art.

As used herein, the term "non-woven web" or "non-woven fabric" or "non-woven substrate or "non-woven", refers to a web that has a structure of individual fibers or fibrous materials which are interlaid, but not in any regular, repeating manner. Non-woven webs have been formed by a variety of processes, such as, for example, air laying processes, meltblowing processes, spunbonding processes and carding processes, including bonded carded web processes.

As used herein, the term "meltblown" refers to the fabrication of non-woven fabrics via a process which generally includes the following steps: (a) extruding molten thermoplastic strands from a spinneret; (b) simultaneously quenching and attenuating the polymer stream immediately below the spinneret using streams of high velocity heated air; (c) collecting the drawn strands into a web on a collecting surface. Meltblown webs can be bonded by a variety of means including, but not limited to, autogeneous bonding, i.e., self bonding without further treatment, thereto-calendaring process, adhesive bonding process, hot air bonding process, needle punch process, hydroentangling process, and combinations thereof.

As used herein, the term "spunbond" refers to the fabrication of non-woven fabric including the following steps: (a) extruding molten thermoplastic strands from a plurality of fine capillaries called a spinneret; (b) quenching the strands of the ethylene-based polymer composition with a flow of air which is generally cooled in order to hasten the solidification of the molten strands of the ethylene-based polymer composition; (c) attenuating the filaments by advancing them through the quench zone with a draw tension that can be applied by either pneumatically entraining the filaments in an air stream or by winding them around mechanical draw rolls of the type commonly used in the textile fibers industry; (d) collecting the drawn strands into a web on a foraminous surface, e.g., moving screen or porous belt; and (e) bonding the web of loose strands into the non-woven fabric. Bonding can be achieved by a variety of means including, but not limited to, thermo-calendaring process, adhesive bonding process, hot air bonding process, needle punch process, hydroentangling process, and combinations thereof.

The non-woven substrate may comprise two or more layers. The two or more layers may be spunbond non-woven fabrics (S), meltblown non-woven layers (M), wet-laid non-woven layers, air-laid non-woven layers, webs produced by any non-woven or melt spinning process. In some embodiments, the non-woven substrate comprises at least one spunbond layer (S) and at least one meltblown layer (M). In other embodiments, the non-woven substrate comprises at least one spunbond layer (S) and at least one meltblown layer (M), and has one of the following structures: SSS, SMS, SMMS, SSMMS, or SSMMMS. In one embodiment the spunbond layer (S) is comprises bicomponent fibers whereby the outermost surface, e.g.; sheath in a core/sheath structure or sea in an islands in the sea structure comprised an ethylene based polymer. In another embodiment the meltblown layer also comprises an ethylene based polymer.

The bi-component fibers according to the present invention comprise: (a) from 25 to 95 percent by weight of a first component comprising at least one or more first polymers, based on the total weight of the bi-component fiber; (b) from 5 to 75 percent by weight of a second component comprising at least an ethylene-based polymer composition, based on the total weight of the bicomponent fiber.

Such one or more first polymer compositions include, but are not limited to, propylene based polymers such as interpolymers (including copolymers) of propylene and one or more α-olefins, or propylene homopolymers, and polyester or polyester copolymers. The one or more first polymer compositions may further comprise additional components such as one or more additives. Such additives include, but are not limited to, antistatic agents, color enhancers, dyes, lubricants, fillers such as TiO2 or CaCO3, opacifiers, nucleators, processing aids, pigments, primary antioxidants, secondary antioxidants, processing aids, UV stabilizers, antiblocks, slip agents, tackifiers, fire retardants, anti-microbial agents, odor reducer agents, anti-fungal agents, and combinations thereof. The one or more first polymer compositions may contain from about 0.01 to about 10 percent by the combined weight of such additives, based on the weight of the ethylene-based polymer composition including such additives.

The bi-component fibers comprise from 5 to 75, for example from 20 to 50, or in the alternative from 25 to 40, percent by weight of a second component comprising at least an ethylene-based polymer composition, based on the total weight of the bicomponent fiber.

The ethylene-based polymer composition comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene-based polymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene, or in the alternative, from the group consisting of 1-hexene and 1-octene.

The term bi-component fiber refers to a fiber which contains two materials whereby the resulting cross-section of the individual fibers resembles sheath/core, tri-lobal, islands in the sea, or a segmented pie, and the like. A common bicomponent fiber configuration is a core-sheath structure, wherein the core comprises homopolymer polypropylene or a polyester and the sheath comprises polyethylene. The polypropylene core provides drawdown capability, spinning stability, heat resistance, modulus, ultimate tensile strength inherent to polypropylene, while providing the added feature of soft touch, lower bonding temperatures, and higher elongation attributed to the addition of the polyethylene sheath.

As used herein, the term "microfibers", refers to small diameter fibers having an average diameter not greater than about 100 microns. Fibers, and in particular, spunbond and meltblown fibers used in the present invention can be microfibers. More specifically, the spunbond fibers can advantageously be fibers having an average diameter of about 14 to 28 microns, and having a denier from about 1.2 to 5.0, whereas the meltblown fibers can advantageously be fibers having an average diameter of less than about 15 microns, or more advantageously be fibers having an average diameter of less than about 12 microns, or even more advantageously be fibers having an average diameter of less than about 10 microns. It also contemplated that the meltblown fibers may have even smaller average diameters, such as less than 5 microns.

As used herein, "stretch-modified" refers to films that undergo at least a first stretch in at least one direction after film formation and prior to subsequent processing steps, such as, lamination or bonding with a substrate or another film. In some embodiments, the films may undergo at least a first stretch in at least one direction to a draw ratio of at least 1.9 to form a stretch-modified film. In other embodiments, the films may undergo at least a first stretch in at least one direction to a draw ratio of at least 3.6 to form a stretch-modified film. In further embodiments, the films may undergo at least a first stretch in at least one direction to a draw ratio of at least 4.5 to form a stretch-modified film. In even further embodiments, films may undergo at least a first stretch in at least one direction to a draw ratio of at least 5.7 to form a stretch-modified film. In even further embodiments, films may undergo at least a first stretch in at least one direction to a draw ratio of at least 6.5 to form a stretch-modified film.

Figure 3:
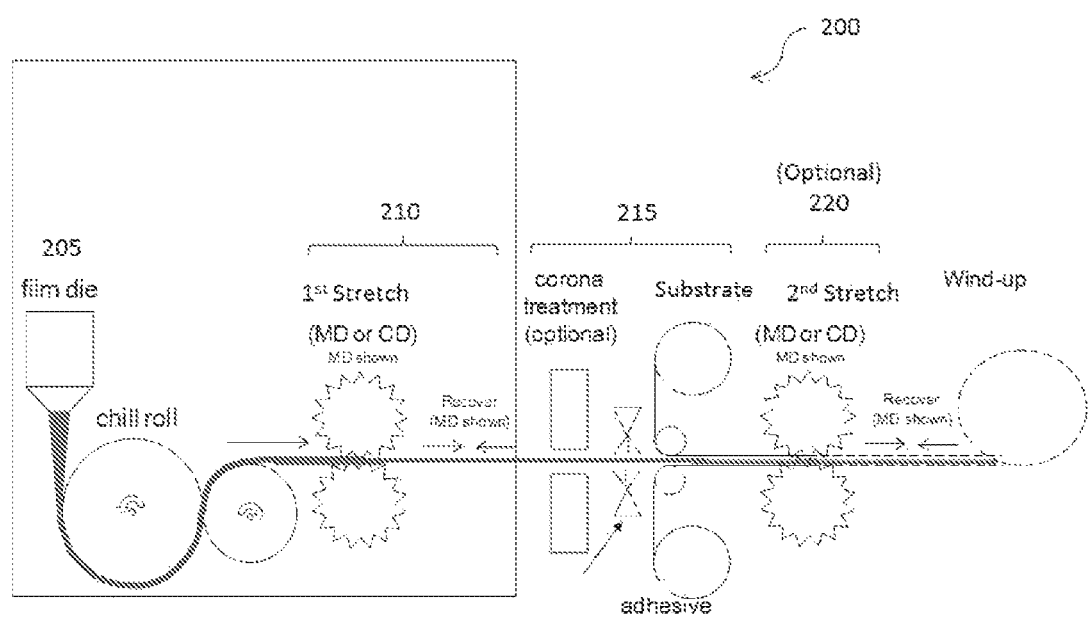
FIG. 3 depicts an in-line cast film process that may be used to prepare stretch-modified multilayer films.

The draw ratio may be determined as described in U.S. Pat. No. 4,116,892 (the '892 patent), and is calculated by the following equation provided in FIG. 3 of '892 patent:

$$\text{Draw Ratio}\left(\frac{l}{w}\right) = \int_0^\pi \frac{1}{\pi}\sqrt{1 + a^2\cos^2 x}\, dx,$$

where l=length of the sinus wave (as shown in FIG. 3 of the '892 patent), a=πd/w, d=groove depth, and w=distance between discs (as shown in FIG. 3 of the '892 patent). The Actual Draw Rate (ADR) is calculated by the following equation:

$$ADR = \frac{(\text{Draw Ratio} - 1)V}{4\frac{d}{w}\sqrt{\frac{R}{d} - \frac{1}{4}}},$$

where d=groove depth, w=distance between discs (as shown in FIG. 3 of the '892 patent), l=length of the sinus wave (as shown in FIG. 3 of the '892 patent), V is the velocity of the film entering the nip of the rollers; and R is the radius of the rollers.

The Blend

Disclosed herein is a film composition that comprises a blend of a majority percentage of a higher molecular weight polyolefin elastomer with a minor percentage of a significantly lower molecular weight polyolefin elastomer, thereby producing an overall average molecular weight blend that enables ease of melt processing in conventional film processes. The resulting blend has a broad molecular weight distribution (Mw/Mn) that is greater than 2.5. The polyolefin elastomers are preferably ethylene/α-olefin interpolymers or propylene/α-olefin interpolymers. The use of a polyolefin elastomer having a broad molecular weight distribution enables ease of processing while maintaining the same weight average molecular weight for the elastomer as compared with an elastomer having a narrower molecular weight distribution. Such compositions display a decreased permanent set and an increased retractive force. The increased retractive force is desirable to hold elastic components of articles (such as diapers, adult incontinence products, and the like) in place during normal wear.

The blend of polyolefin elastomers may be used in films and laminates. As will briefly be detailed later the film may be a monolayer film or a multilayer film. A laminate comprises the film and one or more non-woven layers that are disposed on opposing surfaces of the film.

Disclosed herein too is a method of manufacturing the film composition. The method comprises blending the majority percentage of the higher molecular weight polyolefin elastomer with the minor percentage of the significantly lower molecular weight polyolefin elastomer, while achieving an overall average molecular weight that enables ease of melt processing in conventional film processes. In an exemplary embodiment, the blending comprises melt blending. The blend is advantageous in that it provides improved elastic performance from polyolefin elastomers while enabling their ability to be easily processed into articles (e.g., films) in melt extrusion processes that produce blown and cast films. Such films are particularly useful in elastic components such as laminates with nonwovens, for use in hygiene applications such as diapers, training pants, and adult incontinence articles.

In an embodiment the film composition comprises a blend that comprises plurality of polyolefin elastomers, where at least one fraction of the polyolefin elastomer has a higher molecular weight than any of the other fractions and is present in an amount of greater than 50 wt %, based on the total weight of the blend. In an embodiment, the blend of polyolefin elastomers comprises a first polyolefin elastomer and a second polyolefin elastomer, where the first polyolefin elastomer has a higher molecular weight than the second polyolefin elastomer and where the first polyolefin elastomer is present in the blend in an amount of greater than 50 wt %, based on the total weight of the blend.

In an embodiment, the first and second polyolefin elastomers can comprise a first ethylene/α-olefin interpolymer or a first propylene/α-olefin interpolymer and a second ethylene/α-olefin interpolymer or a second propylene/α-olefin interpolymer respectively. These interpolymer can be a block copolymer, a random copolymer, or a combination thereof.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)n where n is at least 1, preferably an integer greater than 1 such as 2, 3, 4, 5, 10, 15, 20, 30, 40, 50, 60, 70, 80, 90, 100, or higher, "A" represents a hard block or segment and "B" represents a soft block or segment. Preferably, A's and B's are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows. AAA-AA-BBB-BB In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835, entitled "Ethylene/α-Olefin Block Interpolymers", filed on Mar. 15, 2006, in the name of Colin L. P. Shan, Lonnie Hazlitt, et, al. and assigned to Dow Global Technologies Inc., the disclosure of which is incorporated by reference herein in its entirety.

In an embodiment, the ethylene/α-olefin interpolymers used in embodiments of the invention (also referred to as "interpolymer" or "polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In an embodiment, the ethylene/α-olefin interpolymer comprises a blend of two or more ethylene/α-olefin interpolymers wherein each ethylene/α-olefin interpolymer has a different weight average molecular weight. In an exemplary embodiment, the ethylene/α-olefin interpolymer comprises a first ethylene/α-olefin interpolymer and a second ethylene/α-olefin interpolymer, where the first interpolymer has a different weight average molecular weight from the second interpolymer.

In one aspect, the ethylene/α-olefin interpolymers used in embodiments of the invention have a Mw/Mn from about 1.7 to about 3.5 and at least one melting point, Tm, in degrees Celsius and density, d, in grams/cubic centimeter, wherein the numerical values of the variables correspond to the relationship:

$$Tm > -2002.9 + 4538.5(d) - 2422.2(d)^2, \text{ and preferably}$$

$$Tm \geq -6288.1 + 13141(d) - 6720.3(d)^2, \text{ and more preferably}$$

$$Tm \geq 858.91 - 1825.3(d) + 1112.8(d)^2.$$

Such melting point/density relationship is illustrated in the FIG. 1. Unlike the traditional random copolymers of ethylene/α-olefins whose melting points decrease with decreasing densities, the interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable inter polymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d),$$

In some embodiments, the ethylene/α-olefin interpolymers have a tensile strength above 10 MPa, preferably a tensile strength ≥11 MPa, more preferably a tensile strength ≥13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of zero percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer.

Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [CH3/CH2] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013)TH+21.07, where T is the numerical value of the peak elution temperature of the TREF fraction being compared, measured in degrees Celsius.

In addition to the above aspects and properties described herein, the polymers can be characterized by one or more additional characteristics. In one aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.1356)T+13.89, more preferably greater than or equal to the quantity (−0.1356)T+14.93, and most preferably greater than or equal to the quantity (−0.2013)T+21.07, where T is the numerical value of the peak ATREF elution temperature of the TREF fraction being compared, measured in degrees Celsius.

In still another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$T_m \geq (-5.5926)$(mol percent comonomer in the fraction)$+135.90$.

In yet another aspect, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

Heat of fusion(J/gm)$\leq (3.1718)$(*ATREF* elution temperature in Celsius)$-136.58$.

The block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

Heat of fusion(J/gm)$\leq (1.1312)$(*ATREF* elution temperature in Celsius)$+22.97$.

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e., area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infrared detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$ABI = \Sigma(w_i BI_i)$ where $BI_i$ is the block index for the $i^{th}$ fraction of the ethylene/α-olefin interpolymer obtained in preparative TREF, and $w_i$ is the weight percentage of the $i^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the preparative ATREF elution temperature for the $i^{th}$ fraction (preferably expressed in Kelvin), $P_X$ is the ethylene mole fraction for the $i^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1. $T_{AB}$ is the ATREF temperature for a random copolymer of the same composition and having an ethylene mole fraction of $P_{AB}$. $T_{AB}$ can be calculated from the following equation:

$$\text{Ln}P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$\text{Ln}P = -237.83/T_{ATREF} + 0.639$$

$T_{XO}$ is the ATREF temperature for a random copolymer of the same composition and having an ethylene mole fraction of $P_X$. $T_{XO}$ can be calculated from $\text{Ln}P_X = \alpha/T_{XO} + \beta$. Conversely, $P_{XO}$ is the ethylene mole fraction for a random copolymer of the same composition and having an ATREF temperature of $T_X$, which can be calculated from $\text{Ln } P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0 from about 0.8 to about 1.0, or from about 0.9 to about 1.0.

Another characteristic of the ethylene/α-olefin interpolymer is that the ethylene/α-olefin interpolymer comprises at least one polymer fraction which can be obtained by preparative TREF, wherein the fraction has a block index greater than about 0.1 and up to about 1.0 and a molecular weight distribution, $W_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

As noted herein, the blend of ethylene/α-olefin interpolymers (e.g., the blend of the first ethylene/α-olefin interpolymer and the second ethylene/α-olefin interpolymer) disclosed herein has a broad molecular weight distribution (Mw/Mn). The molecular weight distribution of the blend is greater than 2.5, preferably greater than 2.6, even preferably greater than 2.7, and most preferably greater than 2.8. The blend has an upper molecular weight distribution limit of 10.0, or preferably 7.0, or even more preferably 5.0.

For copolymers of ethylene and an α-olefin, the polymers preferably possess (1) a heat of fusion of 85 J/g or less; (2) an ethylene content of at least 50 weight percent; (3) a glass transition temperature, Tg, of less than −25° C., more preferably less than −30° C., and/or (5) one and only one Tm.

The crystallinity, density and heat of fusion of the blend of polyolefin elastomers are listed below in the Table 1 in order of preferred embodiments.

TABLE 1

| Embodiments | Crystallinity (%, calculated) | Density (g/cm³, ASTM D792) | Heat of Fusion (J/g by DSC at 10° C./min) |
| --- | --- | --- | --- |
| Broadest | 3 to 28 | 0.857 to 0.89 | 8.7 to 81.2 |
| Preferred | 3 to 20 | 0.857 to 0.879 | 8.7 to 58 |
| More preferred | 3 to 15 | 0.857 to 0.872 | 8.7 to 43.5 |
| Even more preferred | 3 to 12 | 0.857 to 0.868 | 8.7 to 34.8 |
| Narrowest (most preferred) | 4 to 11 | 0.858 to 0.867 | 11.6 to 31.9 |

Further, the polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the polymers possess a relatively flat storage modulus as a function of temperature in the range from 0 to 100° C. that is characteristic of block copolymers, and heretofore unknown for an olefin copolymer, especially a copolymer of ethylene and one or more C3-8 aliphatic α-olefins. By the term "relatively flat" in this context is meant that log G' (in Pascals) decreases by less than one order of magnitude between 50 and 100° C., preferably between 0 and 100° C.

The interpolymers may be further characterized by a thermomechanical analysis penetration depth of 1 mm at a temperature of at least 90° C. as well as a flexural modulus of from 3 kpsi (20 MPa) to 13 kpsi. (90 MPa). Alternatively, the interpolymers can have a thermomechanical analysis penetration depth of 1 mm at a temperature of at least 104° C. as well as a flexural modulus of at least 3 kpsi (20 MPa).

They may be characterized as having an abrasion resistance (or volume loss) of less than 90 mm3.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5,662,938, filed Mar. 17, 2005; PCT Application No, PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety.

The interpolymers also exhibit a unique crystallization and branching distribution relationship. That is, the interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the interpolymers is due to the unique distribution of the comonomer in blocks within the polymer backbone. In particular, the interpolymers may comprise alternating blocks of differing comonomer content (including homopolymer blocks). The interpolymers may also comprise a distribution in number and/or block size of polymer blocks of differing density or comonomer content, which is a Schultz-Flory type of distribution. In addition, the interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers.

Moreover, the interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuffling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, region-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in some embodiments are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dimes, polyenes, alkenylbenzenes, and the like. Examples of such comonomers include C3-C20 α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentane, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are C3-C20 aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with C1-C20 hydrocarbyl or cyclohydrocarbyl groups. Also included are mixtures of such olefins as well as mixtures of such olefins with C4-C40 diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentane, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octaliene, 1,9-decadiene, other $C_4$-$C_{40}$α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octaliene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dimes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbomene (MNB); 5-propenyl-2-norbornene, 5-isopropylidene-2-norbornene, 5-(4-cyclopentenyl)-2-norbornene, 5-cyclohexylidene-2-norbomene, 5-vinyl-2-norbornene, and norhornadiene. Of the dienes typically used to prepare EPDMs, the particularly preferred dienes are 1,4-hexadiene (HD), 5-ethylidene-2-norbomene (ENB), 5-vinylidene-2-norbomene (VNB), 5-methylene-2-norborene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a C3-C20 α-olefin, especially propylene, and optionally one or more diene monomers. Preferred α-olefins for use in this embodiment of the present invention are designated by the formula CH2=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 5 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional groups present in the functional interpolymer can vary. The functional group can typically be present in a copolymer-type functionalized interpolymer in an amount of at least 1.0 weight percent, preferably at least 5 weight percent, and more preferably at least 7 weight percent. The functional group will typically be present in a copolymer-type functionalized interpolymer in an amount less than 40 weight percent, preferably less than 30 weight percent, and more preferably less than 25 weight percent.

An exemplary olefin block copolymer comprises ethylene and octene. A commercially available olefin block copolymer that can be used in the film is INFUSE™ from the Dow Chemical company.

Another exemplary ethylene for as an elastomer is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C., The melting point is measured by differential scanning calorimetry (DSC) as described, for example, in U.S. Pat. No. 5,783,638, The α-olefin is preferably a $C_3$-20 linear, branched or cyclic α-olefin. Examples of C3-20 α-olefins include propene, 1 butene, 4-methyl-1-pentene, 1-hexene, 1 octene, 1-decene, 1-dodecene, 1 tetradecene, 1 hexadecene, and 1-octadecene. The α olefins can also contain a cyclic structure such as cyclohexane or cyclopentane, resulting in an α-olefin such as 3 cyclohexyl-1-propene (allyl cyclohexane) and vinyl cyclohexane.

Illustrative homogeneously branched ethylene-α-olefin copolymers include ethylene/propylene, ethylene/butene, ethylene/1 hexene, ethylene/1 octene, ethylene/styrene, and the like. Illustrative terpolymers include ethylene/propylene/1-octene, ethylene/propylene/butene, ethylene/butene/1 octene, and ethylene/butene/styrene. The copolymers can be random copolymers or block copolymers.

Examples of commercially available homogeneously branched ethylene-α-olefin interpolymers include homogeneously branched, linear ethylene-α-olefin copolymers (e.g. TAFMER™ by Mitsui Petrochemicals Company Limited and EXACT™ by Exxon Chemical Company), and the homogeneously branched, substantially linear ethylene-α-olefin polymers (e.g., INFUSE™, AFFINITY™ and ENGAGE™ polyethylene commercially available from the Dow Chemical Company). An exemplary olefin block copolymer is INFUSE™ 9007 that comprises ethylene and octene commercially available from the Dow Chemical company.

In another embodiment, the polyolefin elastomer is a propylene based elastomer. Copolymers comprising propylene and an α-olefin are also known as propylene/α-olefin interpolymers. As noted above, the polyolefin elastomers may also comprise random or block propylene polymers (i.e., polypropylenes). The propylene based elastomer typically comprises 90 or more mole percent units derived from propylene. The remainder of the units in the propylene copolymer is derived from units of at least one α-olefin.

The α-olefin component of the propylene based elastomer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene/α-olefin interpolymer and is characterized as having substantially isotactic propylene sequences. The propylene/α-olefin interpolymers include propylene-based elastomers (PBE). "Substantially isotactic propylene sequences" means that the sequences have an isotactic triad (mm) measured by 13C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by 13C NMR spectra.

The propylene/α-olefin copolymer comprises units derived from propylene and polymeric units derived from one or more α-olefin comonomers. Exemplary comonomers utilized to manufacture the propylene-α-olefin copolymer are C2 and C4 to C10 α-olefins; for example, C2, C4, C6 and C8 α-olefins.

The propylene/α-olefin interpolymer comprises 1 to 40 percent by weight of one or more alpha-olefin comonomers. All individual values and sub-ranges from 1 to 40 weight percent are included herein and disclosed herein. The propylene/α-olefin interpolymer may have a melt flow rate in the range of 0.1 to 500 grams per 10 minutes (g/10 min), measured in accordance with ASTM D1238 (at 230° C./2.16 Kg). The propylene/α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene/α-olefin interpolymer has a density of typically less than 0.895 g/cm³. The propylene/α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene/α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene/α-olefin interpolymers are further described in the U.S. Pat. Nos. 6,960,635 and 6,525,157, the entire contents of which are incorporated herein by reference. Such propylene/α-olefin interpolymers are commercially available from The Dow Chemical Company, under the trade name VERSIFY™, or from ExxonMobil Chemical Company, under the trade name VISTAMAXX™.

In an embodiment, the first polyolefin elastomer has a higher weight average molecular weight than the second polyolefin elastomer. The first polyolefin elastomer has a weight average molecular weight ($M_w$) of 125,000 to 350,000 grams per mole, preferably 140,000 to 325,000 grams per mole, more preferably 150,000 to 300,000. The first polyolefin elastomer has a melt index ($I_2$) of less than 0.7 g/10 minutes at 190° C., preferably less than 0.5, most preferably less than 0.2 g/10 minutes when measured at 2.16 Kg and at 190° C. as per ASTM D1238. The first polyolefin elastomer is present in the blend in a weight percentage of greater than 50 wt %, preferably greater than 60 wt %, more preferably greater than 70 wt %, more preferably greater than 80 wt %, based on the total weight of the core layer. A preferred first polyolefin elastomer is an olefin block copolymer or an olefin random copolymer. A preferred olefin block copolymer or olefin random copolymer is an ethylene/α-olefin copolymer.

The second polyolefin elastomer has a lower weight average molecular than the first ethylene/α-olefin interpolymer. The second polyolefin elastomer has a weight average molecular weight ($M_w$), of 15,000 to 75,000, preferably 15,000 to 60,000 grams per mole. The second polyolefin elastomer preferably has a melt index $I_2$ greater than 5 g/10 minute at 190° C., preferably greater than 10, preferably greater than 20, preferably greater than 30, and more preferably greater than 100 g/10 minute when measured at 2.16 Kg and at 190° C. as per ASTM D1238. The second polyolefin elastomer is present in the blend in a weight percentage of less than 50 wt % preferably less than 40 wt %, more preferably less than 30 wt % and more preferably less than 20 wt %, based on the total weight of the core layer. A preferred second polyolefin elastomer is an olefin block copolymer or an olefin random copolymer. A preferred olefin block copolymer or olefin random copolymer is an ethylene/α-olefin copolymer.

The overall melt index of the blend is 0.5 to 10 g/10 minutes, preferably 1.0 to 6 g/10 minutes, and more preferably 1.5 to 3.0 g/10 minutes when measured at 2.16 Kg and at 190° C. as per ASTM D1238. The density of the first and second ethylene/α-olefin interpolymers are each preferably less than 0.9, preferably less than 0.89, more preferably less than 0.88, and most preferably less than 0.87 g/cc. Table 2 shows the melt index ranges in order of preferred embodiments for a blend of the first ethylene/α-olefin interpolymer and the second ethylene/α-olefin interpolymer.

TABLE 2

| Embodiments | Melt Index (g/10 min, 2.16 kg @190° C., ASTM D1238) |
|---|---|
| Broadest | less than or equal to 10 |
| Preferred | 0.2 to 9 |
| More preferred | 0.2 to 8 |
| Even more preferred | 0.4 to 6 |
| Narrowest (most preferred) | 0.5 to 3 |

The blend compositions disclosed herein have a decreased permanent set and increased retractive force. The increased retractive force is desirable to hold elastic components of articles such as diapers, adult incontinence products, and the like in place during normal wear.

The blend composition may be manufactured by melt blending or may be produced via dual reactor polymerization (where the dual reactors are in parallel or in series) wherein the high molecular weight fraction is made in the first reactor and the low molecular weight species is made in the second reactor. This allows for intimate mixing.

Blend compositions may be compression molded or preferably melt extruded into a film using conventional processes such as cast film extrusion, blown film extrusion, extrusion coating, and the like. Films can be monolayer or coextruded. The majority of the film structure comprises the blend composition having the broad molecular weight distribution. After a film is manufactured it can be optionally stretched in the intended use direction. For example, for products such as diaper ears the stretching is conducted in the cross direction (perpendicular to the machine direction) or alternatively, stretched in the machine direction for large side panels.

Films & Laminates

The films may comprise a single layer (a monolayer film) or multiple layers (a multilayer film) and may also be used in laminates as detailed below.

A monolayer film comprises only the core layer and does not have any other layers that contain the aforementioned polyolefin elastomer blend.

The multilayer films may comprise a core layer comprising the aforementioned polyolefin elastomer blend and at least one outer layer. The core layer may be positioned adjacent to the at least one outer layer or alternatively, there may be at least one intervening layer (e.g., inner layer) between the core layer and the at least one outer layer. In some embodiments, the films comprise a core layer and two outer layers, wherein the core layer is positioned between the two outer layers. In other embodiments, an inner layer may be positioned between the core layer and one or both of the two outer layers. In further embodiments, the films comprise a core layer positioned between two outer layers, and two or more inner layers positioned between the core layer and one or both of the two outer layers. Each inner layer may be the same or different than other inner layers present in the films. It should be understood that the stretch-modified elastomeric multilayer films may comprise other combinations of core, outer, and inner layers in accordance with the teachings herein.

In embodiments herein, the thickness ratio of the at least one outer layer to the core layer can be captured by percentages. For example, in some embodiments, the core layer comprises at least about 50%, 60%, 70%, 80%, 90%, or 95% of the overall film thickness. In other embodiments, the core layer comprises from about 50% to about 95% of the overall film thickness. In other embodiments, the core layer comprises from about 60% to about 90% of the overall film thickness. In further embodiments, the core layer comprises from about 70% to about 90% of the overall film thickness. In some embodiments, the at least one outer layer independently comprise from about 2% to about 30%, from about 5% to about 30%, or from about 5% to about 20% of the overall film thickness. In embodiments herein where two or more outer layers are present, each outer layer may have an equal thickness, or alternatively, may have an unequal thickness. In embodiments herein, an inner layer may be present. The inner layer may be positioned between the core layer and the at least one outer layer. In some embodiments, the inner layer may independently comprise from about 2% to about 20%, from about 2% to about 15%, or from about 2% to about 10% of the overall film thickness. In embodiments herein where two or more inner layers are present, each inner layer may have an equal thickness, or alternatively, may have an unequal thickness.

The core layer of the film may optionally comprise one or more slip agents. As used herein "slip agent" or "slip additive" means an external lubricant. Examples of suitable slip agents may include, but are not limited to, amide slip agents, such as, for example, saturated fatty acid amides or ethylenebis(amides), an unsaturated fatty acid amides, or ethylenebis(amides) or combinations thereof. In some embodiments, the slip agent may include oleamide, erucamide, linoleamide, erucamidoethylerucamide, oleamidoethyloleamide, erucamidoethyloleamide, oleamidoethylerucamide, stearamidoethylerucamide erucamidoethylpalmitamide, palmitatnidoethyloleamide, palmitamide, stearamide arachidamide, behenamide, stearyl stearamide, palmityl palmitamide, stearyl arachidamide, stearamidoethylstearamide, stearamidoethylpalmitamide, palmitamido-ethylstearamide, or combinations thereof. Such slip agents are also disclosed in, for example, U.S. Pat. No. 7,608,668, entitled "Ethylene/α-Olefin Block Interpolymers," filed on Mar. 15, 2006, in the name of Cohn L. P. Shan, Lonnie Hazlitt, et. al. and assigned to Dow Global Technologies Inc., the disclosure of which is incorporated by reference herein in its entirety. In some embodiments, the film further comprises a slip agent in the core layer.

The total amount of the one or more slip agents present in the core layer may range from 0 to 1 wt %. All individual values and subranges are included and disclosed herein. For example, in some embodiments, the total amount of the one or more slip agents present in the core layer is from 0 to 0.5 wt %. In other embodiments, the total amount of the one or more slip agents present in the core layer is from 0.05 to 0.3 wt %. Slip additives may be added to a carrier resin in the form of a pre-compound masterbatch. The carrier resin may be an ethylene-α-olefin block copolymer as previously described herein. Suitable methods for incorporating slip agents into a carrier resin are known to those of ordinary skill in the art and can include, for example, melt blending or solution blending, which may be performed using, for example, an extruder (single-screw, twin-screw) or static mixer. In some embodiments, a slip agent masterbatch containing the desired amount of slip agent is incorporated during the film preparation step by dry blending with other polymer resins. For example, in a melt extrusion process, the shear and heat imparted will result in the melting of the masterbatch and the distribution of the slip agent throughout a melt stream that will subsequently become one or more layers disclosed herein. Of course, other suitable methods for incorporating slip agents into the one or more layers may be used, taking into consideration the carrier resin, slip agent, compatibilizers, process aids, stabilizers, modifiers, pigments, and/or other components that may be included in the masterbatch formulation.

The at least one outer layer of the film independently comprising the aforementioned blend or a third ethylene-α-olefin block copolymer and an antiblock agent. The third ethylene-α-olefin block copolymer may be an ethylene-α-olefin block copolymer as previously described herein. In some embodiments, the third ethylene-α-olefin block copolymer is an ethylene/octene block copolymer, wherein the ethylene content is greater than 80 mol. % of the whole polymer and the octene content is from 10 to 15 mol. %, or from 1.5 to 20 mol. % of the whole polymer. In some embodiments herein, the aforementioned blend is different from the third ethylene-α-olefin block copolymer.

In embodiments herein, the at least one outer layer of the film independently comprises an antiblock agent. Examples of suitable antiblock agents may include, but are not limited to, clay, aluminum silicate, diatomaceous earth, silica, talc, calcium carbonate, limestone, fumed silica, magnesium sulfate, magnesium silicate, alumina trihydrate, magnesium oxide, zinc oxide, titanium dioxide, or combinations thereof. In some embodiments, the antiblock agent is selected from the group consisting of talc, calcium carbonate, silica, nephilene syenite, and combinations thereof. Other suitable antiblock agents can be found in U.S. Pat. No. 7,741,397 and Zweifel Hans et al., "Plastics Additives Handbook," Hamer Gardner Publications, Cincinnati, Ohio, 5th edition, Chapter 7, pages 585-600 (2001), which are incorporated herein by reference.

The antiblock agent may be independently present in the at least one outer layer in amounts ranging from 2.5 wt % to 30 wt %. In some embodiments, the antiblock agent may be independently present in the at least one outer layer in amounts ranging from 2.5 wt % to 25 wt %, 2.5 wt % to 20 wt %, 2.5 wt % to 18 wt %, 3.5 wt % to 18 wt %, 5 wt % to 20 wt %, 5 wt % to 18 wt %, or 5 wt. to 15 wt % of the at least one outer layer. Suitable methods for incorporating antiblock agents into a carrier resin are known to those of ordinary skill in the art and can include, for example, melt blending or solution blending, which may be performed using, for example, an extruder (single-screw, twin-screw) or static mixer. In some embodiments, an antiblock masterbatch containing the desired amount of antiblock agent is incorporated during the film preparation step by dry blending with other polymer resins. For example, in a melt extrusion process, the shear and heat imparted will result in the melting of the masterbatch and the distribution of the antiblock agent throughout a melt stream that will subsequently become one or more layers disclosed herein. Of course, other suitable methods for incorporating antiblock agents into the one or more layers may be used, taking into consideration the carrier resin, slip agent, compatibilizers, process aids, stabilizers, modifiers, pigments, and/or other components that may be included in the masterbatch formulation.

The film may further comprise non-polymeric additives that can be added to one or more layers. Exemplary additives may include, process oil, flow improvers, fire retardants, antioxidants, plasticizers, pigments, vulcanizing or curative agents, vulcanizing or curative accelerators, cure retarders, processing aids, UV stabilizers, antistats, pigments, flame retardants, tackifying resins, and the like. These compounds may include fillers and/or reinforcing materials. Other additives, which may be employed to enhance properties, include coloring agents. Lubricants, nucleating agents, reinforcements, and tillers (including granular, fibrous, or powder-like) may also be employed. The exemplary lists provided above are not exhaustive of the various kinds and types of additives that can be employed with the present invention.

In embodiments herein, the film may be a cast film or a blown film. The overall thickness of the film is not particularly limited, but, in some embodiments, may be less than 20 mils, less than 16 mils, less than 10 mils, less than 5 mils, or less than 3 mils. The thickness of any of the individual layers can vary widely, and may be determined by process, use and economic considerations.

It has been found that the films described herein may minimize the probability and severity of film blocking on rolls prior to lamination. Blocking refers to a defect in which film layers on a roll fuse or adhere together making the roll difficult to unwind for subsequent processing steps. Without intending to be bound by theory, it is believed that films described herein minimize the tendency of blocking by lowering temperature, pressure, various pressure points, in-wound tension and surface area contact. It should be understood, however, that the need to minimize blocking is balanced against competing needs, such as, film handling, and other subsequent conversion steps. Various methods suitable for quantifying film blocking include ASTM D3354-11, ISO 11502, and others.

These films can optionally be stretch modified. It does not have to be stretch modified to realize improvements in extensional force and retractive force, but doing so can provide improvements in extensional force and in retractive force. As will be seen later, both the first cycle hysteresis and the second cycle hysteresis in a tensile test conducted on the broad molecular weight blend exhibit higher donning force and retractive force vs a narrow molecular weight distribution blend. It is indeed plausible that these same trends would exist if the films were stretch modified by ring rolling, intermeshing gears or machine direction orientation (MDO). It has been found that the films described herein may exhibit a reduction in permanent set as compared to an identical film that has not been stretch-modified. In some embodiments, the film may exhibit a 2.5% reduction in permanent set as compared to an identical film that has not been stretch-modified. In other embodiments, the film may exhibit a 5% reduction in permanent set as compared to an identical film that has not been stretch-modified. In further embodiments, the film may exhibit a 7.5% reduction in permanent set as compared to an identical film that has not been stretch-modified. In even further embodiments, the film may exhibit a 10% reduction in permanent set as compared to an identical film that has not been stretch-modified.

It has been found that the films described herein may exhibit a first cycle retraction force that is greater than a first cycle retraction force of an identical film that has not been stretch-modified. As noted above, stretch modification is optional and is not essential to the invention. In some embodiments, the film may exhibit a first cycle retraction force that is at least 25% greater than a first cycle retraction force of an identical film that has not been stretch-modified. In other embodiments, the film may exhibit a first cycle retraction force that is at least 30% greater than a first cycle retraction force of an identical film that has not been stretch-modified. In further embodiments, the film may exhibit a first cycle retraction force that is at least 35% greater than a first cycle retraction force of an identical film that has not been stretch-modified. In even further embodiments, the film may exhibit a first cycle retraction force that is at least 45% greater than a first cycle retraction force of an identical film that has not been stretch-modified. In even further embodiments, the film may exhibit a first cycle retraction force that is at least 50% greater than a first cycle retraction force of an identical film that has not been stretch-modified.

It has been found that the films described herein may exhibit a second cycle retraction force that is greater than a second cycle retraction force of an identical film that has not been stretch-modified. In some embodiments, the film may exhibit a second cycle retraction force that is at least 20% greater than a second cycle retraction force of an identical film that has not been stretch-modified. In other embodiments, the film may exhibit a second cycle retraction force that is at least 25% greater than a second cycle retraction force of an identical film that has not been stretch-modified. In further embodiments, the film may exhibit a second cycle retraction force that is at least 35% greater than a second cycle retraction force of an identical film that has not been stretch-modified. In even further embodiments, the film may exhibit a second cycle retraction force that is at least 45% greater than a second cycle retraction force of an identical film that has not been stretch-modified. In even further embodiments, the film may exhibit a second cycle retraction force that is at least 50% seater than a second cycle retraction force of an identical film that has not been stretch-modified.

It has been found that the films described herein may exhibit a haze value that is less than a haze value of an identical film that has not been stretched-modified. Without being bound by theory, it is believed that since the stretch-modified films do not undergo plastic deformation, they result in a decrease in surface roughness (due to differential recovery behavior), and therefore, a decrease in haze values. In some embodiments, the film may exhibit a haze value that is at least 2% less than a haze value of an identical film that has not been stretched-modified. In other embodiments, the film may exhibit a haze value that is at least 3% less than a haze value of an identical film that has not been stretched-modified. In further embodiments, the film may exhibit a haze value that is at least 5% less than a haze value of an identical film that has not been stretched-modified. Haze is measured according to ASTM D1003 using a HazeGard PLUS Hazemeter available from BYK Gardner of Melville, N.Y., with a light source CIE Illuminant C.

The films described herein may be used in a laminate. The laminated may comprise a substrate laminated to a side of the film. In some embodiments, the substrate may be a nonwoven. In other embodiments, the substrate may be an elastic nonwoven. In further embodiments, the substrate may be an extensible, non-elastic nonwoven. As used herein the term "laminate" refers to a composite structure of two or more sheet material layers that have been adhered through a bonding step, such as through adhesive bonding, thermal bonding, point bonding, pressure bonding, extrusion coating or ultrasonic bonding. For instance, a multilayered laminate may include some layers of nonwovens. As used herein, the term "nonwoven web," or "nonwoven fabric," or "nonwoven" refers to a web that has a structure of individual fibers or threads which are interlaid, but not in any regular, repeating manner. Nonwoven webs may be formed by a variety of processes, such as, for example, air laying processes, meltblowing processes, spunbonding processes and carding processes, including bonded carded web processes. "Meltblown" refers to the process of extruding a molten thermoplastic material through a plurality of fine, usually circular, die capillaries as molten threads or filaments into a high velocity gas (e.g., air) stream which attenuates the filaments of molten thermoplastic material to reduce their diameter, which may be to a microfiber diameter. Thereafter, the meltblown fibers are carried by the high velocity gas stream and are deposited on a collecting surface to form a web of randomly dispersed meltblown fibers. "Spunbonded" refers to the process of extruding a molten thermoplastic material as filaments from a plurality of fine, usually circular, capillaries of a spinneret with the diameter of the extruded filaments then being rapidly reduced by drawing the fibers and collecting the fibers on a substrate.

The nonwoven web may comprise a single web, such as a spunbond web, a carded web, an airlaid web, a spunlaced web, or a meltblown web. However, because of the relative strengths and weaknesses associated with the different processes and materials used to make nonwoven fabrics, composite structures of more than one layer are often used in order to achieve a better balance of properties. Such structures are often identified by letters designating the various lays such as SM for a two layer structure consisting of a spunbond layer and a meltblown layer, SMS for a three layer structure, or more generically $SX_nS$ structures, where "X" can be independently a spunbond layer, a carded layer, an airlaid layer, a spunlaced layer, or a meltblown layer and "n" can be any number, although for practical purposes is generally less than 5. In order to maintain structural integrity of such composite structures, the layers must be bonded together. Common methods of bonding include point bonding, adhesive lamination, and other methods known to those skilled in the art. All of these structures may be used in the present invention.

The nonwovens can also be laminates such as spunbond layers and some meltblown layers, such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference in their entirety. The nonwoven may be an elastic nonwoven comprised of elastic materials or an extensible nonwoven, such as, spunlaced materials which are hydroentangled spun-melt nonwovens. The nonwoven may be inelastic, but elongatable or extensible. Such inelastic nonwovens may be used in elastic laminates by bonding them to the elastic film while the elastic film is in a stretched condition so that when the elastic film is allowed to retract the nonwoven gathers or puckers between the portions where the nonwoven is bonded to the elastic film creating corrugations in the nonwovens. This live stretch process of lamination is described in U.S. Pat. No. 4,720,415. Other means of corrugating nonwovens are available commercially, such as those supplied by Micrex. Extensible, but inelastic nonwovens can also be used in elastic laminates through a process described as incremental stretching. In these processes the elastic film and extensible, but non-elastic nonwoven are joined in the unstretched state. The laminate is then subjected to stretching or tension as described in U.S. Pat. Nos. 5,167,897, 4,107,364, 4,209,463, and 4,525,407. When the tension is released on the web the nonwoven is permanently deformed in the areas where it was stretched and does not go back to its original shape so that the elastic laminate is now able to stretch and recover without significant constraint from the nonwoven in the areas where it has been pre-stretched.

The laminates may be formed by providing a multilayer film comprising a core layer comprising the blend disclosed herein; performing a first stretch of the film in at least one direction to a draw ratio of at least 1.9 to form a stretch-modified multilayer film; and substantially relaxing the stretch-modified multilayer film in the at least one direction. In some embodiments, a first stretch of the film is performed in at least one direction a draw ratio of at least 3.6 to form the stretch-modified multilayer film. In other embodiments, a first stretch of the film is performed in at least one direction to a draw ratio of at least 4.5 to form the stretch-modified multilayer film. In further embodiments, a first stretch of the film is performed in at least one direction to a draw ratio of at least 5.7 to form the stretch-modified multilayer film. In further embodiments, a first stretch of the film is performed in at least one direction to a draw ratio of at least 6.5 to form the stretch-modified multilayer film.

Stretching may be accomplished by methods known in the art, such as, ring rolling, tenter framing, incremental stretching, or other suitable methods known in the art. Examples of stretching methods can also be found in U.S. Pat. Nos. 4,368,565, 5,143,679, 5,156,793, 5,167,897, 8,337,190, 2003/0088228, or 2004/0222553, all of which are herein incorporated by reference. For illustration purposes only, in some embodiments, stretching is accomplished through the use of at least one pair of intermeshed grooved rolls or intermeshed discs. See, for e.g., U.S. Pat. Nos. 4,153,751, 4,368,565, International App. No. WO 2004/020174, and U.S. Pub. No. 2006/0003656, all of which are herein incorporated by reference.

In some embodiments, the process further comprises laminating the stretch-modified multilayer film to at least one substrate to form a laminate. As previously noted herein the substrate may be a nonwoven, an elastic nonwoven, or an extensible, but non-elastic nonwoven. In some embodiments, the laminates may be formed using a process that is in-line with the stretching. The film may be sandwiched between two separate substrates or non-woven laminates.

The laminates may undergo subsequent processing steps to provide a finished, desired product. For example, in some embodiments, the laminate may be subjected to a second stretch in at least one direction to a draw ratio of 3.6 or less of its pre-second stretch length. Such methods are often applied to extensible, non-elastic nonwoven film laminates to make them more elastic. Examples of such similar stretching methods are described above. It should be understood that this step is optional, and in other embodiments, the laminate does not undergo a second stretch. Additional embodiments are described and illustrated in the accompanying figures.

Figure 2:
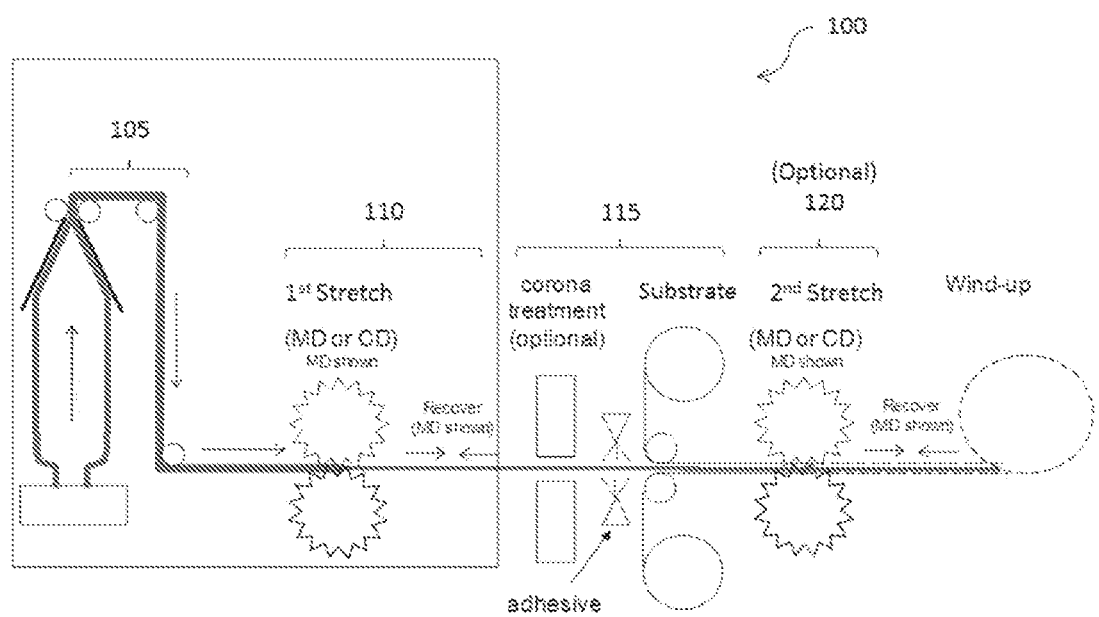
FIG. 2 depicts an in-line blown film process that may be used to prepare stretch-modified multilayer films.

Referring to FIG. 2, depicted is an in-line blown film process (100) that may be used to prepare stretch-modified multilayer films. In a first step (105), a multilayer blown film is coextruded. The multilayer film may comprise a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt % of an antiblock agent, wherein the second ethylene-α-olefin block copolymer comprises at least 50 mol. % ethylene, has a melt index ($I_2$) from 0.5 g/10 min to 25 g/10 min, and has a density of 08350 g/cc to 0.890 g/cc, and wherein the density of the first ethylene-α-olefin block copolymer is equal to or greater than the density of the second ethylene-α-olefin block copolymer. In a second step (110), the multilayer blown film is then stretched in at least one direction to a draw ratio of at least 1.9 to form a stretch-modified multilayer film. The stretch-modified multilayer film is allowed to substantially relax in the at least one direction. In a third step (115), the stretch-modified multilayer film is laminated to at least one substrate to form a laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may also be optionally applied either to the stretch-modified multilayer film or substrate. Of course, other lamination techniques may be used, which may include laminating the stretch modified multilayer film via thermal bonding or ultrasonic bonding to another film or non-woven material. In an optional fourth step (120), the laminate may undergo a second stretch in at least one direction to a draw ratio of 3.6 or less. In some embodiments, the laminate does not undergo a second stretch. In embodiments where the laminate has undergone a second stretch, the laminate may be allowed to substantially relax in the at least one direction of the second stretch. The laminate may then be wound into a roll. It should be understood herein that the process shown and described in FIG. 2 is merely exemplary, and it would be obvious to those skilled in the art that various other changes and modifications can be made without departing from the spirit and scope of the invention. For example, each step may be performed continuously (i.e., in-line as shown), semi-continuously, or in separate unit operations. In some embodiments, an intermediate material may be produced that, in some examples, may be temporarily wound into a roll until it is ready further processing, at which point, the intermediate material is unwound and processed. The intermediate material may be produced after one or more process steps.

Referring to FIG. 3, depicted is an in-line cast film process (200) that may be used to prepare stretch-modified multilayer films. In a first step (205), a multilayer cast film is coextruded. The multilayer film may comprise a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc, and wherein the density of the first ethylene-α-olefin block copolymer is equal to or greater than the density of the second ethylene-α-olefin block copolymer. In a second step (210), the multilayer cast film is then stretched in at least one direction to a draw ratio of at least 1.9 to form a stretch-modified multilayer film. The stretch-modified multilayer film is allowed to substantially relax in the at least one direction. In a third step (215), the stretch-modified multilayer film is laminated to at least one substrate to form a laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may be optionally applied either to the stretch-modified multilayer film or substrate. Of course, as noted above, other lamination techniques may be used, which may include laminating the stretch modified multilayer film via thermal bonding or ultrasonic bonding to another film or non-woven material. In an optional fourth step (220), the laminate may undergo a second stretch in at least one direction to a draw ratio of 3.6 or less. In some embodiments, the laminate does not undergo a second stretch. In embodiments where the laminate has undergone a second stretch, the laminate may be allowed to substantially relax in the at least one direction of the second stretch. The laminate may then be wound into a roll. It should be understood herein that the process shown and described in FIG. 2 is merely exemplary, and it would be obvious to those skilled in the art that various other changes and modifications can be made without departing from the spirit and scope of the invention. For example, each step may be performed continuously (i.e., in-line as shown), semi-continuously, or in separate unit operations in some embodiments, an intermediate material may be produced that, in some examples, may be temporarily wound into a roll until it is ready further processing, at which point, the intermediate material is unwound and processed. The intermediate material may be produced after one or more process steps.

Test Methods

Unless otherwise stated, the following test methods are used. All test methods are current as of the filing date of this disclosure.

Density

The samples are prepared according to ASTM D1928. Measurements are made using ASTM D792, Method B.

Melt Index

Melt index, or $I_2$, is determined according to ASTM D1238 at 190° C., 2.16 kg.

Strain at Break and Stress at Break

Tensile specimens (prepared according to ASTM D638) were die cut from compression molded films. The specimen width is taken as 4.8 mm. The gauge length is taken as 22.25 mm. The strain and stress at break was measured with an INSTRON™ 5565 instrument equipped with a 100 N load cell and pneumatic grips under ambient conditions. The specimens were stretched at a constant speed of 500%/min (or about 111.25 min/min) until sample failure. Five specimens were measured for each prepared film to determine the average and standard deviation of the strain at break and the stress at break.

Differential Scanning Calorimetry (DSC)

Baseline calibration of the TA DSC Q1000 was performed by using the calibration wizard in the software. First, a baseline was obtained by heating the cell from −80° C. to 280° C. without any sample in the aluminum DSC pan. After that, sapphire standards were used according to the instructions in the wizard. Then about 1-2 mg of a fresh indium sample was analyzed by heating the sample to 180° C., cooling the sample to 120° C. at a cooling rate of 10° C./min followed by keeping the sample isothermally at 120° C. for 1 min, followed by heating the sample from 120° C. to 180° C. at a heating rate of 10° C./min. The heat of fusion and the onset of melting of the indium sample were determined and checked to be within 0.5° C. from 156.6° C. for the onset of melting and within 0.5 J/g from 28.71 J/g for the heat of fusion. Then deionized water was analyzed by cooling a small drop of fresh sample in the DSC pan from 25° C. to −30° C. at a cooling rate of 10° C./min. The sample was kept isothermally at 30° C. for 2 minutes and heated to 30° C. at a heating rate of 10° C./min. The onset of melting was determined and checked to be within 0.5° C. from 0° C. Samples of polymer were then pressed into a thin film at a temperature of 177° F. About 5 to 8 mg of sample was weighed out and placed in a DSC pan. A lid was crimped on the pan to ensure a closed atmosphere. The sample pan was placed in the DSC cell and then heated at a high rate of about 100° C./min to a temperature of about 30° C. above the polymer melt temperature. The sample was kept at this temperature for 5 minutes. Then the sample was cooled at a rate of 10° C./min to −40° C. to generate a cooling curve, and kept isothermally at that temperature for 5 minutes. Consequently the sample was heated at a rate of 10° C./min until melting was complete to generate a 2nd heating curve. The DSC melting peak is measured as the maximum in heat flow rate (W/g) with respect to the linear baseline drawn between −30° C. and the end of melting for the $2^{nd}$ heating curve. The heat of fusion is measured as the area under the melting curve between −30° C. and the end of melting using a linear baseline. The % crystallinity for polyethylene resins may be calculated using the following equation:

$$\% \text{ Crystallinity} = \frac{\text{Heat of fusion(J/g)}}{292 \text{ J/g}} \times 100\%$$

Permanent Set

The films were measured in the cross direction orientation with an INSTRON™ 5565 instrument equipped with a 100 N load cell and pneumatic grips under ambient conditions. Four 1 inch×5 inch specimens were cut from cast films and each sample was placed in the tensile tester jaws with a 1 inch gauge length. The specimen thickness is specified in Table 8 below. The specimens were initially stretched to achieve a pre-force load of 0.05 N at a speed of 50 mm/min. The specimens were then elongated to an applied strain of 200% (step 1) at a constant speed of 250 mm/min, then held at a 200% strain for 30 seconds (step 2). The specimens were then unloaded to 0% strain at the same speed (250 mm/min) (step 3) and then held for 60 seconds. (step 4) The specimens were then re-stretched to an applied strain of 200% at the same speed (250 mm/min) (step 5), held for 30 seconds (step 6), and unloaded back to 0% strain at the same speed (250 mm/min) (step 7), thus completing two load and unload cycles. Three specimens were tested for each film at the maximum applied strain of 200%. The permanent set was determined as applied strain on the second load cycle at which the stress was 0.1 N.

First and Second Cycle Retraction & Extension Force

The films were measured in the cross direction orientation with an INSTRON™ 5565 instrument equipped with a 100 N load cell and pneumatic grips under ambient conditions. Four 1 inch×5 inch specimens were cut from cast films and each sample was placed in the tensile tester jaws with a 1 inch gauge length. The specimens were initially stretched to achieve a pre-force load of 0.05 N at a speed of 50 mm/min. The specimens were then elongated to an applied strain of 200% at a constant speed of 250 mm/min, then held at a 200% strain for 30 seconds. The specimens were then unloaded to 0% strain at the same speed (250 mm/min) and then held for 60 seconds. The specimens were then re-stretched to an applied strain of 200% at the same speed (250 mm/min), held for 30 seconds, and unloaded back to 0% strain at the same speed (250 mm/min), thus completing two load and unload cycles. At least three trials were tested for each maximum applied strain. The extension force at strain levels of 50% were recorded for the first and second load cycles. The retraction force at strain levels of 50% were recorded for the first and second unload cycles. Three specimens were tested for each film at the maximum applied strain of 200%. The extension stress and retraction stress at strain levels of 50% were recorded for the first and second load and unload cycles.

The blends and the articles manufactured therefrom are manufactured therefore are detailed in the following non-limiting examples.

EXAMPLES

Example 1

This example was conducted to study the properties of a film that comprises the blend of polyolefin elastomers disclosed above. Table 3A shows the different copolymers along with their properties that were used in the blend. Table 3B shows the weight average molecular weight, the number average molecular weight and the molecular weight distribution of for the various resins shown in the Table 3A.

TABLE 3A

| Grade | Designation | Density (g/cm$^3$) ASTM D792 | Melt Index (g/10 minutes at 2.16 kg/190° C.) as per ASTM D1238 | Melting point measured by DSC at 10° C./minutes | Description |
|---|---|---|---|---|---|
| INFUSE 9007 | A | 0.866 | 0.5 | 119 | Ethylene-octene block copolymer |
| INFUSE 9107 | B | 0.866 | 1 | 119 | Ethylene-octene block copolymer |
| INFUSE 9507 | C | 0.866 | 5 | 119 | Ethylene-octene block copolymer |
| INFUSE 9807 | D | 0.866 | 15 | 118 | Ethylene-octene block copolymer |
| Experimental grade #1 | E | 0.866 | 30 | 118 | Ethylene-octene block copolymer |

TABLE 3B

| Grade | Weight average molecular weight (Mw) (g/mole) | Number average molecular weight (Mn) (g/mole) | Mw/Mn |
|---|---|---|---|
| INFUSE 9007 | 157800 | 65210 | 2.42 |
| INFUSE 9107 | 125200 | 55460 | 2.26 |
| INFUSE 9507 | 88820 | 37660 | 2.36 |
| INFUSE 9807 | 66550 | 28020 | 2.42 |
| Experimental Grade #1 | 57870 | 27300 | 2.12 |

Dry blends were made using resins described in Table 4 above and then melt extruded into monolayer cast films on a Dr. Collin cast film line equipped with a 30 mm extruder. The extruder was run at a rate 5.4 kg/hr and the line speed was set at 3-4 m/min depending upon the film thickness. The purpose of this example was to hold melt index constant while increasing the weight percent of high molecular weight polymer to achieve a higher retractive force for the overall the INFUSE olefin block copolymer blend.

TABLE 4

| Sample # | Description | Melt Index (I$_2$) | Mw/Mn |
|---|---|---|---|
| 1 (Control film) - Narrow MWD | 75 wt % INFUSE 9107 + 25 wt % INFUSE 9507 | 1.52 | 2.44 |
| 2 - Medium MWD | 52 wt % INFUSE 9007 + 48 wt % INFUSE 9507 | 1.50 | 2.47 |
| 3 - Broad MWD | 68 wt % INFUSE 9007 + 32 wt % INFUSE 9807 | 1.43 | 2.63 |
| 1 - Extra Broad MWD | 73 wt % INFUSE 9007 + 27 wt % Experimental Grade #1 | 1.29 | 2.71 |

Films were tested for permanent set and for hysteresis performance to a strain of 200%. The testing was conducted as per the details provided in the aforementioned section titled first and second cycle retraction & extension force.

The % change in permanent set (PS) is determined as follows:

$$\% \text{ Change in } PS = \frac{(PS \text{ of Inv. Film}) - (PS \text{ of Comp. Film})}{(PS \text{ of Comp. Film})} \times 100\%$$

The % change in first cycle retraction force (1$^{st}$ RF) is determined as follows:

$$\% \text{ Change in } 1^{st} RF = \frac{(1^{st} RF \text{ of Inv. Film}) - (1^{st} RF \text{ of Comp. Film})}{(1^{st} RF \text{ of Comp. Film})} \times 100\%$$

Figure 4:
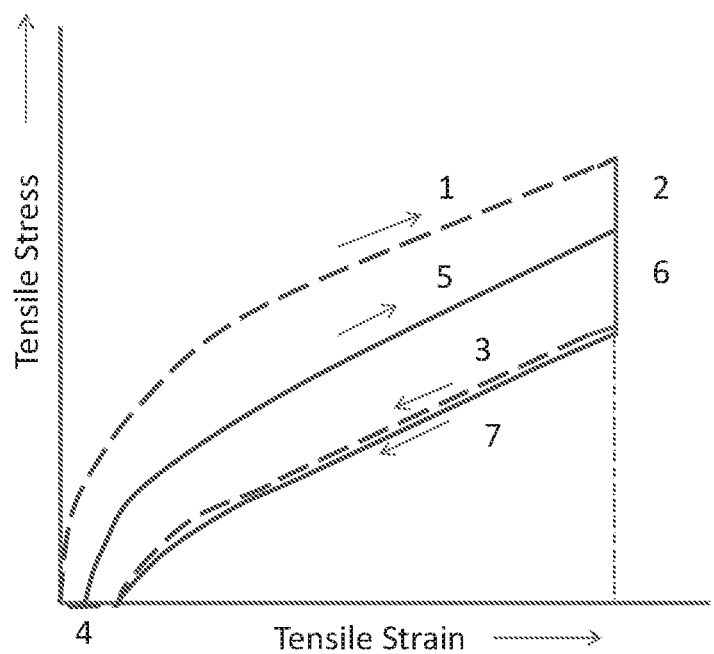
FIG. 4 is an exemplary graphical depiction of the tensile behavior of the film when subjected to 2 cycles of stress and strain.

Sample #s 3 and 4 that have the broadest molecular weight distribution because they contain the largest amount of INFUSE™ 9007 (melt index=0.5) show significant increase in donning force as well as the retractive force at both the 1st and 2$^{nd}$ cycles of the hysteresis test. The results for this test are shown in the FIGS. 4 and 5. FIG. 4 is an explanatory diagram that is used to explain the results seen in the FIG. 5, which are discussed in detail below.

During the hysteresis testing of the film (which is conducted up to a strain value of 200%), the stress increases along line 1. When the strain reaches 200%, the stretching is stopped and the film is held at this strain for 30 seconds during which the stress in the film reduces as represented by line 2. After the 30 seconds, the film is unloaded reduced and the stress is measured during this stress reduction. The reduction in strain is represented by the line 3 till the strain is zero. The film is allowed to sit for 60 seconds with no strain on it. The film does not return to its original length but instead retains some of the strain placed on it. This is termed a permanent set in the FIG. 4, is represented by point 4 which is the point where the stress reads 0.1 N at the onset of the second extension to 200% represented by line 5. The process is repeated thus completing two loading cycles. During the second cycle, the stress is increased along line 5, is held for 30 seconds at 200% and allowed to relax (line 6) and the strain is reduced to zero strain via line 7. When the film has a broader molecular weight distribution or higher amounts of the high molecular weight polymer, the donning and retractive force increase significantly versus the narrow molecular weight distribution film (1) as shown in the Table 5 below.

TABLE 5

| | 1st Cycle strain (%) | Extension 1st Cycle stress(Mpa) | % change vs narrow | Retraction 1st Cycle stress(Mpa) | % change vs narrow | 2nd Cycle strain (%) | Extension 2nd Cycle stress(Mpa) | % change vs narrow | Retraction 2nd Cycle stress(Mpa) | % change vs narrow |
|---|---|---|---|---|---|---|---|---|---|---|
| Narrow | 50 | 1.53 | n/a | 0.24 | n/a | 50 | 0.71 | n/a | 0.19 | n/a |
| Med | 50 | 1.60 | 4.61 | 0.23 | −1.93 | 50 | 0.72 | 2.02 | 0.19 | 1.66 |
| Broad | 50 | 1.79 | 16.60 | 0.47 | 98.37 | 50 | 1.11 | 57.12 | 0.42 | 119.50 |
| Ext Broad | 50 | 2.26 | 47.63 | 0.58 | 143.95 | 50 | 1.33 | 88.45 | 0.50 | 166.56 |

The permanent set for the samples 1 through 4 gets progressively lower: 25.7%, 26.7%, 12.8% and 11.8% respectively. This may be seen in the FIG. 5. As the amount of high molecular weight in the blend increases and the molecular weight distribution gets broader, the permanent set decreases.

Films were pre-stretched in the Instron to 500% and then allowed to relax before conducting Hysteresis testing. This was done to simulate stretch modification. As shown below in Table 6, similar trends in higher retractive force can be seen for the films with the largest amount of higher Mw polymer in the blends.

TABLE 6

| | | 2nd Cycle Retraction Force @100% (MPa) | | 2nd Cycle Extension Force @100% (MPa) | |
|---|---|---|---|---|---|
| Monolayer Structure 30 mm Extruder | Target MI | 0% Stretch | 500% Stretch | 0% Stretch | 500% Stretch |
| 75% INFUSE 9107 + 25% INFUSE 9507 | 1.5 | 0.769 | 0.645 | 1.281 | 1.186 |
| 52% INFUSE 9007 + 48% INFUSE 9507 | 1.5 | 0.788 | 0.680 | 1.307 | 1.265 |
| 68% INFUSE 9007 + 32% INFUSE 9807 | 1.5 | 0.894 | 0.671 | 1.555 | 1.316 |
| 73% INFUSE 9007 + 27% Experimental Grade #1 | 1.5 | 1.108 | 0.822 | 1.923 | 1.679 |

Example 2

Similar to Example 1, dry blends were produced leaving the overall melt index at around 2.5 grams/10 minute as per ASTM D1238, while broadening the molecular weight distribution by including larger amounts of INFUSE™ 9007. Films were produced via a Dr. Collin cast film line equipped with a 30 mm extruder. The final blend of the series shows a significant increase of molecular weight distribution as represented by Mw/Mn (2.68 vs. 2.44) over the control film (Sample #1). Table 7 shows the compositions along with the melt index as well as the molecular weight distribution while FIG. 6 displays the results of cycling the tensile stress (as detailed above in the Example 1).

TABLE 7

| Sample # | Description | Melt Index ($I_2$) | Mw/Mn | Permanent set (%) |
|---|---|---|---|---|
| 5 (Control film) | 43 wt % INFUSE 9107 + 57 wt % INFUSE 9507 | 2.36 | 2.44 | 21 |
| 6 | 30 wt % INFUSE 9007 + 70 wt % INFUSE 9507 | 2.30 | 2.42 | 18.7 |
| 7 | 53 wt % INFUSE 9007 + 47 wt % INFUSE 9807 | 2.21 | 2.68 | 12.7 |

Figure 5:
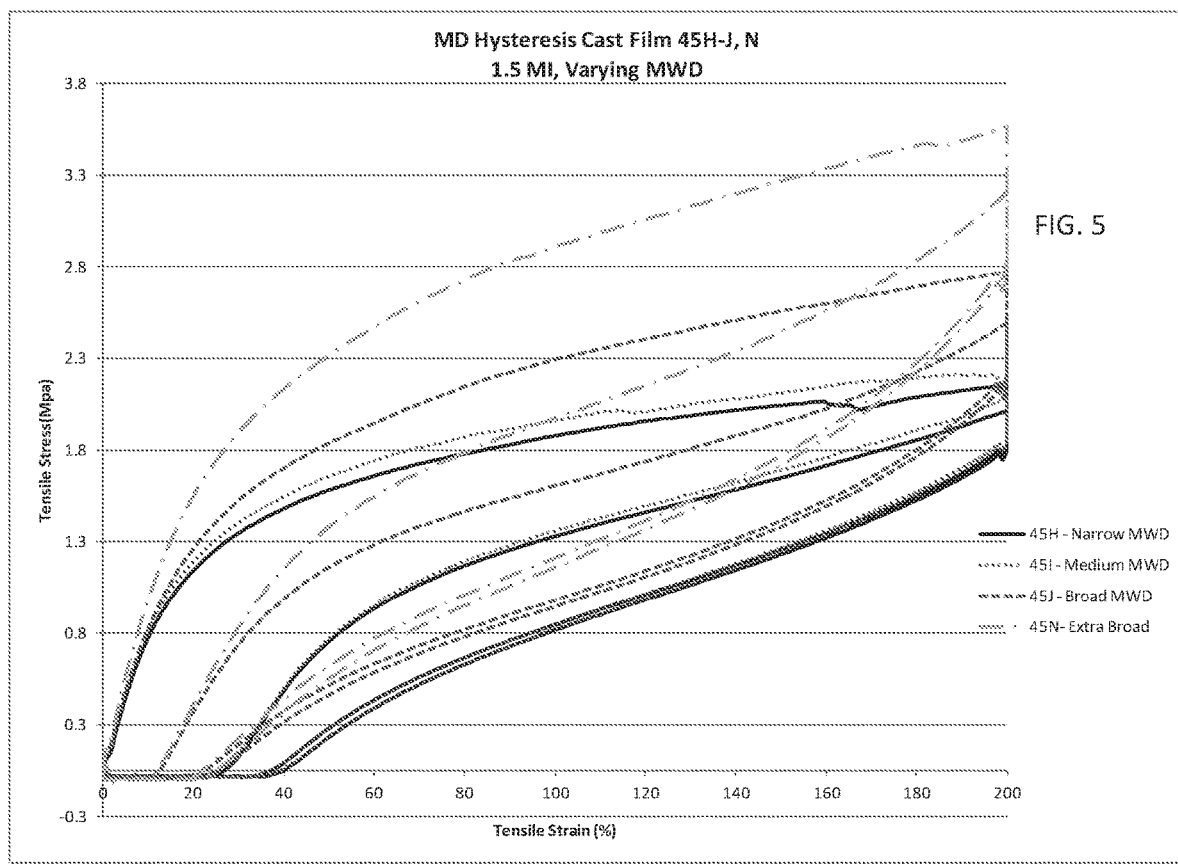
FIG. 5 is a graph that depicts the tensile behavior of the films having different molecular weight distributions when subjected to 2 successive stress-strain cycles.
Figure 6:
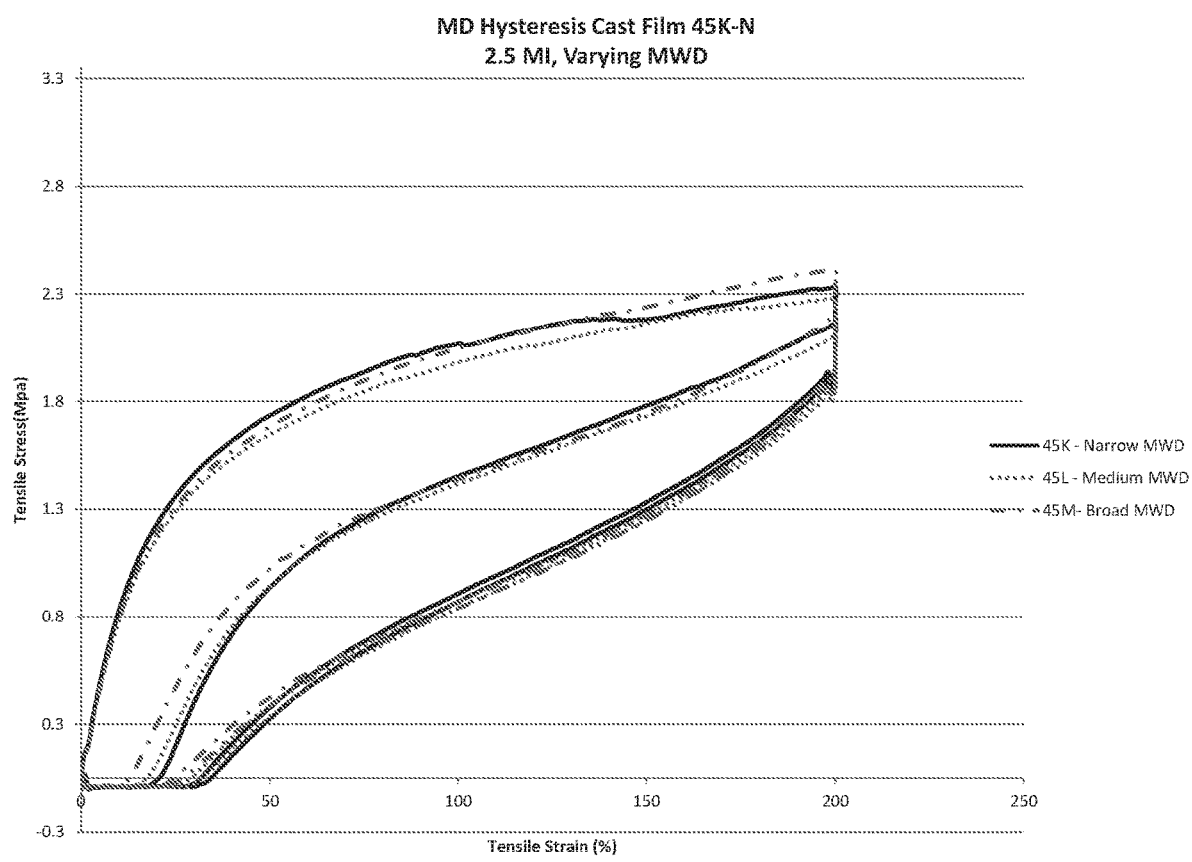
FIG. 6 is another graph that depicts the tensile behavior of the films having different molecular weight distributions when subjected to 2 successive stress-strain cycles.

The results as seen in the FIG. 6 show the same trends as seen in the FIG. 5—notably that the permanent set decreases as the Mw/Mn increases.

What is claimed is:

1. A polymer blend comprising:
    a first polyolefin elastomer having a weight average molecular weight of 120,000 to 350,000 grams per mole; and
    a second polyolefin elastomer having a weight average molecular weight of 15,000 to 75,000 grams per mole; wherein the overall melt index of the polymer blend is less than 8 g/10 minutes when measured as per ASTM D1238 at 2.16 kilograms at 190° C.; wherein the first polyolefin elastomer is present in the blend in an amount of greater than 50 wt %, based on the total weight of the blend; wherein the first polyolefin elastomer and the second polyolefin elastomer each have a density in the range of 0.857 to 0.89 g/cm$^3$ and are each a linear olefin block copolymer which does not include styrene monomer; wherein the polymer blend has a molecular weight distribution Mw/Mn that is greater than 2.5.

2. The blend of claim 1, wherein the first polyolefin elastomer and the second polyolefin elastomer are both propylene-based elastomers.

3. The blend of claim 1, wherein the olefin block copolymers are propylene/a-olefin block copolymers.

4. The blend of claim 1, wherein each olefin block copolymer is an ethylene/α-olefin block copolymer.

5. An article comprising the blend of claim 1, wherein the article is a film.

6. The article of claim 5, wherein the film upon being stretch modified exhibits a 2.5 to 10% reduction in permanent set when compared with an identical film that has not been stretch modified.

7. The article of claim 5, wherein the film upon being stretch modified exhibits a first cycle force that is at least 25% greater than a first cycle retraction force of an identical film that has not been stretch modified.

8. The article of claim 5, wherein the article is a multi-layered laminate that comprises the film with at least one non-woven layer disposed on a surface of the film.

9. A method of manufacturing the film of claim 5 comprising:
    blending the first polyolefin elastomer having a weight average molecular weight of 120,000 to 350,000 grams per mole; and the second polyolefin elastomer having a weight average molecular weight of 15,000 to 75,000 grams per mole to form the polymer blend; wherein the overall melt index of the polymer blend is less than 8 g/10 minutes when measured as per ASTM D1238 at 2.16 kilograms at 190° C.; wherein the polymer blend has a molecular weight distribution Mw/Mn that is greater than 2.5; and forming the polymer blend into the film.

10. The method of claim 9, wherein the forming comprises extrusion, molding, casting, or a combination thereof.

11. The method of claim 9, further comprising performing a first stretch of the film in at least one direction to form a stretch-modified film and substantially relaxing the stretch-modified multilayer film in the at least one direction.

12. The method of claim 11, further comprising laminating the film to a non-woven layer to form a laminate.

13. The method of claim 12, further comprising laminating the stretch-modified film to a non-woven layer to form a laminate.

* * * * *